Jan. 14, 1964 L. D. WIEGERT 3,117,563
ROTARY COMBUSTION ENGINE
Filed Sept. 28, 1960 4 Sheets-Sheet 1

INVENTOR.
L.D. WIEGERT
BY

Jan. 14, 1964 L. D. WIEGERT 3,117,563
ROTARY COMBUSTION ENGINE
Filed Sept. 28, 1960 4 Sheets—Sheet 4

INVENTOR.
L.D. WIEGERT
BY

United States Patent Office 3,117,563
Patented Jan. 14, 1964

3,117,563
ROTARY COMBUSTION ENGINE
Lenard D. Wiegert, R.F.D. 2, Box 4, Ashland, Nebr.
Filed Sept. 28, 1960, Ser. No. 59,116
3 Claims. (Cl. 123—16)

This invention relates to rotary engines and, more particularly, it is the subject of this invention to provide a rotary engine which is adapted to develop more power proportional to its size and fuel input.

A further objective is to provide an engine which will operate with a lesser vibration than has been the case with rotary engines.

Further object is to provide an engine which will operate with lesser wear because it would have two (2) inner gears rather than one as has sometimes been proposed, as better holds the rotor away from the stator walls.

A further objective is to provide a rotary engine having more than one (1) plug, whereby continual combustion is taking place at one plug or the other alternately.

A further objective is to provide an engine, the rotor of which can be in a preferred form, preferably a 5-sided polygon.

Still another object is to provide an engine with sealing points protruding inwardly from the stator wall and defining chambers disposed between the stator wall and the rotor.

Figure 1:
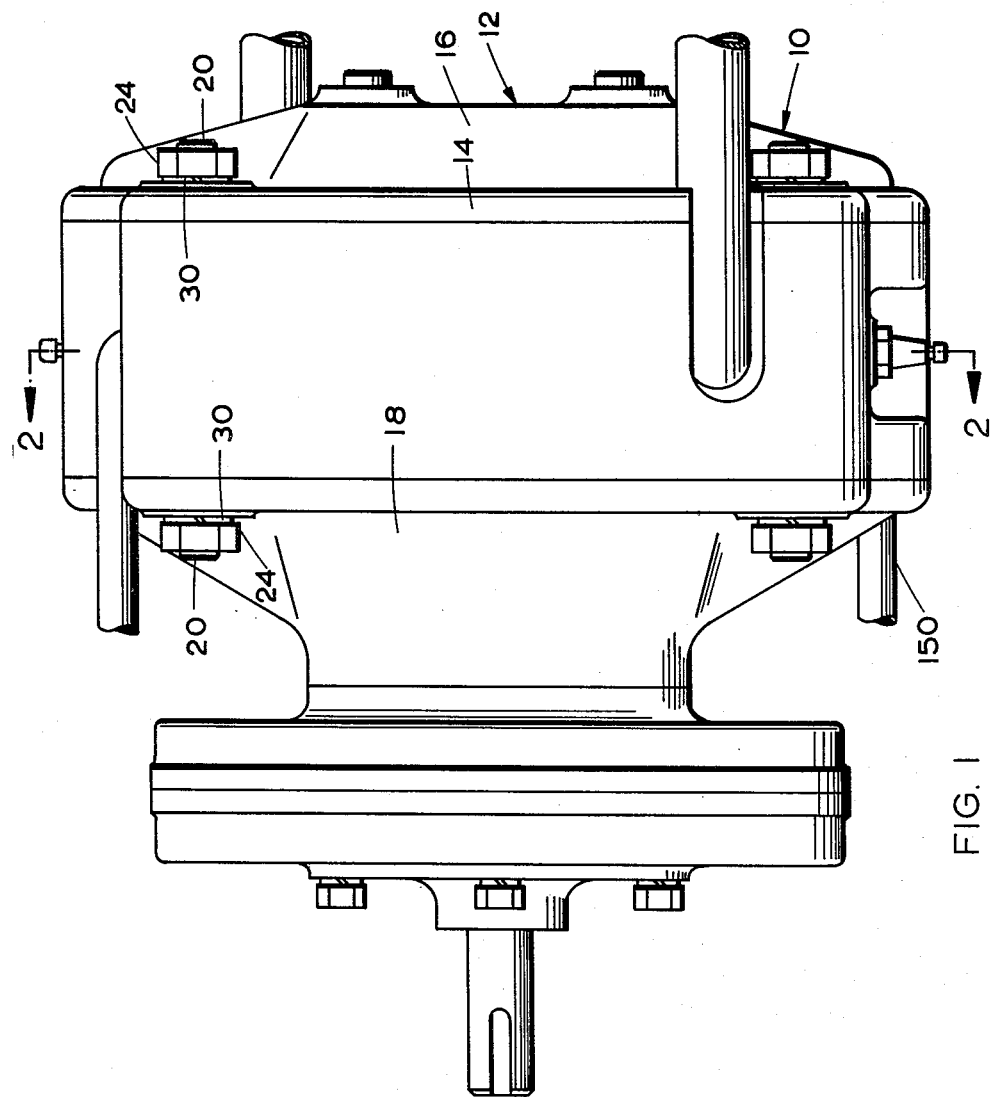
FIGURE 1 is a side elevation of the engine of this invention.

The engine is best seen from the outside in FIGURE 1 in which the engine as a whole is generally designated by the numeral 10 having a housing or stator generally indicated at 12, provided with a center portion 14 and end portions 16 and 18, which latter are attached to the center portion 14 by bolts 20 and nuts 24, the bolts extending through the lock washers 30 and through suitable openings 36 in the central portion and through suitable openings not shown in the end portions 16 and 18.

The central portion 14 is a casting having water jacket openings 50 therein to which water can be continuously delivered by means not shown, and exhausted.

The interior of the stator central portion 14 has an inner wall 60 which is provided with a shape which is, to use a general word, somewhat 4-sided preferably, when a rotor 70, which is an exterior generally of a 5-sided polygon is used. The five surfaces 74 of the exterior of the rotor are preferably convex for defining a curvature as seen in the cross section between the points 80 of the rotor outer side and the points 80 are preferably provided with recesses 82 for receiving inserts 84, which latter preserve on their exterior the general shape of the rotor as described but which are formed of a material better suited to the possibility of abrasion against and wear against the interior walls of the stator.

The recesses 82 each have a constricted lower portion 83 in which the lower end of a spring 85 is received and each insert 84 has a recess 83′ in its inner side for receiving this spring 85. Each insert 82 has a convex outer surface, the terminal end portion 85′ of which, has the curvature of the deepest recess of the inner wall 60 of the stator center portion 14. The inserts 84 are thus slidably received in the recess 82 for radially sliding movement and are urged outwardly by the springs 85.

The interior wall 60 of the stator is provided with a first inwardly protruding portion 90 which divides the stator wall into a first gas intake recess-forming wall portion 76, which latter, with the rotor partly define a first fuel injection chamber 78.

The first stator inwardly protruding portion 90 also divides the stator wall into a first combustion recess-forming wall portion 92, which latter, with the rotor 74, partly define a first combustion chamber 94.

The stator inner wall also has a second inwardly extending portion 110 and the first and second inwardly protruding stator portions 90 and 110 are disposed approximately straight across the stator inner wall from each other through the center 210 of the rotor. The second stator inwardly extending portion 110 divides the stator wall into a second gas intake recess-forming wall portion 104 which is on the rearward side with respect to rotor rotation from the protruding portion 110, and on the forward side of the portion 110 is a second gas combustion recess-forming wall portion 120, which latter, with the rotor partly define a second gas combustion chamber 122.

First and second fuel injection passages 150 and 160 extend through the stator central portion 14 and open upon the first and second gas intake chambers 78 and 112 respectively.

Similarly a first gas exhaust pipe 170 extends through the stator center portion 14 to an opening 172 which latter opens upon a first combustion chamber 94. Likewise a second gas escape pipe 180 extends through the stator center portion 14 to an opening 182 which opens upon the second gas escape chamber 88.

The first and second combustion chambers 94 and 120 each have a spark plug 188 in communication therewith through the first and second spark plug recesses 190 and 192.

The space between the stator inner wall 60 and the rotor is sealed by stator vanes 193 disposed radially of the rotors and received in stator vane recesses 194 having parallel walls radial with respect to the rotor. Each stator vane 193 is elongated, has a rounded inner end, a suitable spring 195 and is located in the inner end of each stator vane recess 194 for urging each stator vane 193 inwardly.

Each stator vane 193 is located closely adjacent to one of the exhaust pipes 170 and just after the exhaust pipe with respect to the direction of rotation of the rotor whereby there are two stator vanes in total, one just after each exhaust pipe, whereby the vanes 193 force the gases out the exhaust pipes 170 when each insert 84 passes the respective vane 193.

Figure 2:
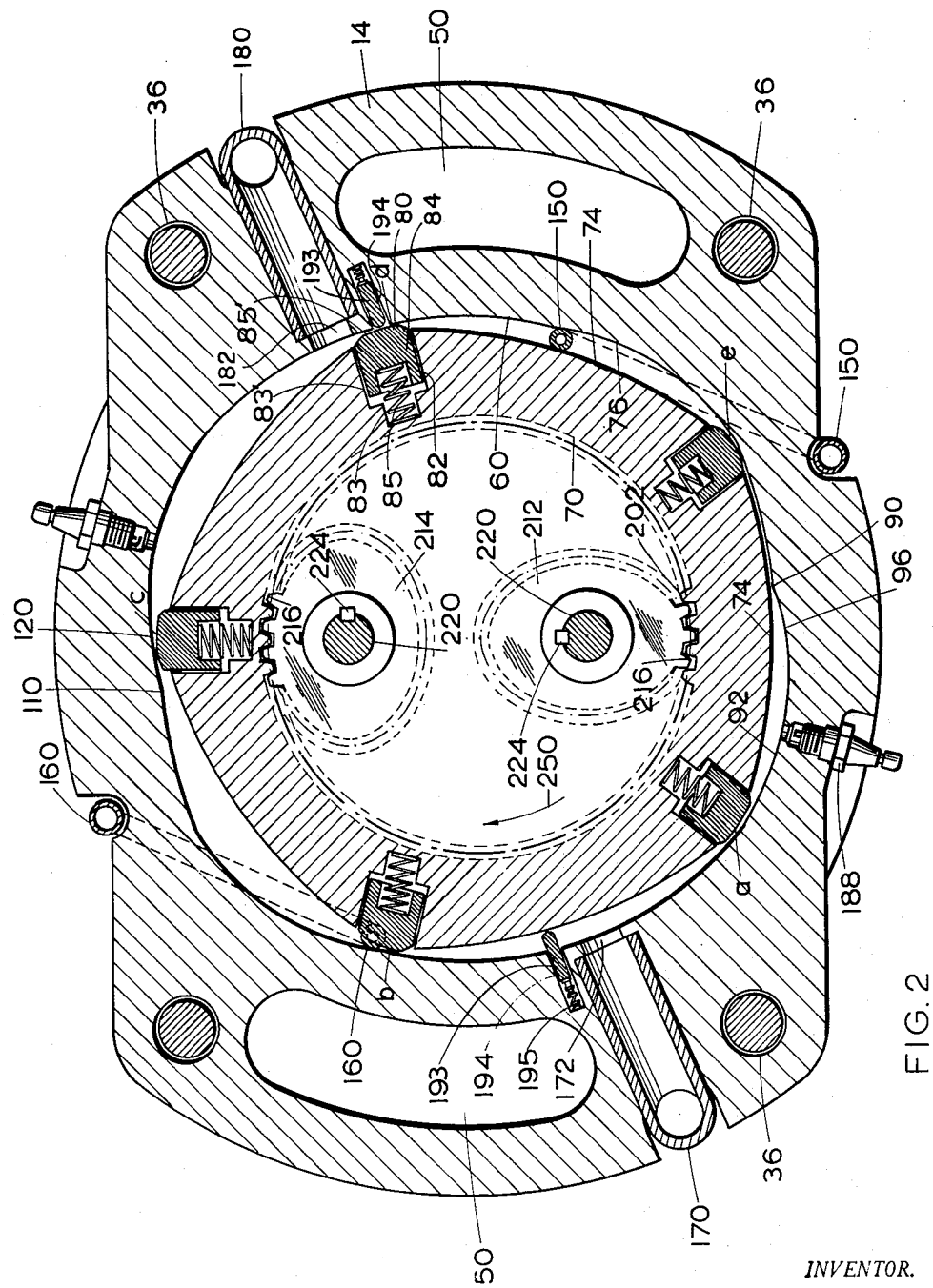
FIGURE 2 is a view-in-section taken along the line 2—2 of FIGURE 1.

The interior of the rotor has a generally circular wall 200 which is provided with teeth extending around it as best seen in FIGURE 2, the teeth being seen at 202, each tooth being elongated and being disposed in parallelism with a center axis of the engine which latter can be identified by a point 210.

The rotor is carried on two generally oval-shaped gears 212 and 214, the exterior of which are provided with teeth 216 adapted to mesh with the teeth 202 of the rotor.

Each gear 212 and 214 is mounted on a shaft 220 which is held by a key 224 to the respective gear, whereby power generated by the motor is delivered through the shafts 220.

*In Operation*

It will be seen that when the parts are as shown in FIGURE 2, one of the five points of the rotor, which can be designated at "a," is in a position touching the wall of the first combustion recess 92, whereby the combustion chamber 94 is sealed off since at this point a following rotor point "e" is touching the wall of the first intake recess 76. At this time ignition occurs in the first combustion chamber 94 because of its spark plug 188.

Next, the rotor will rotate clockwise as indicated by the arrow 250 because of the force of the gases on that side 74 of the rotor which is disposed between the rotor points "a" and "e," since that outer surface area of the rotor along that outer side 74 of the rotor which is disposed between point "a" and the stator protruding point 90 is on the left side of the center of the rotor as seen in FIGURE 2, thus exerting a clockwise torque on the rotor.

Figure 3:
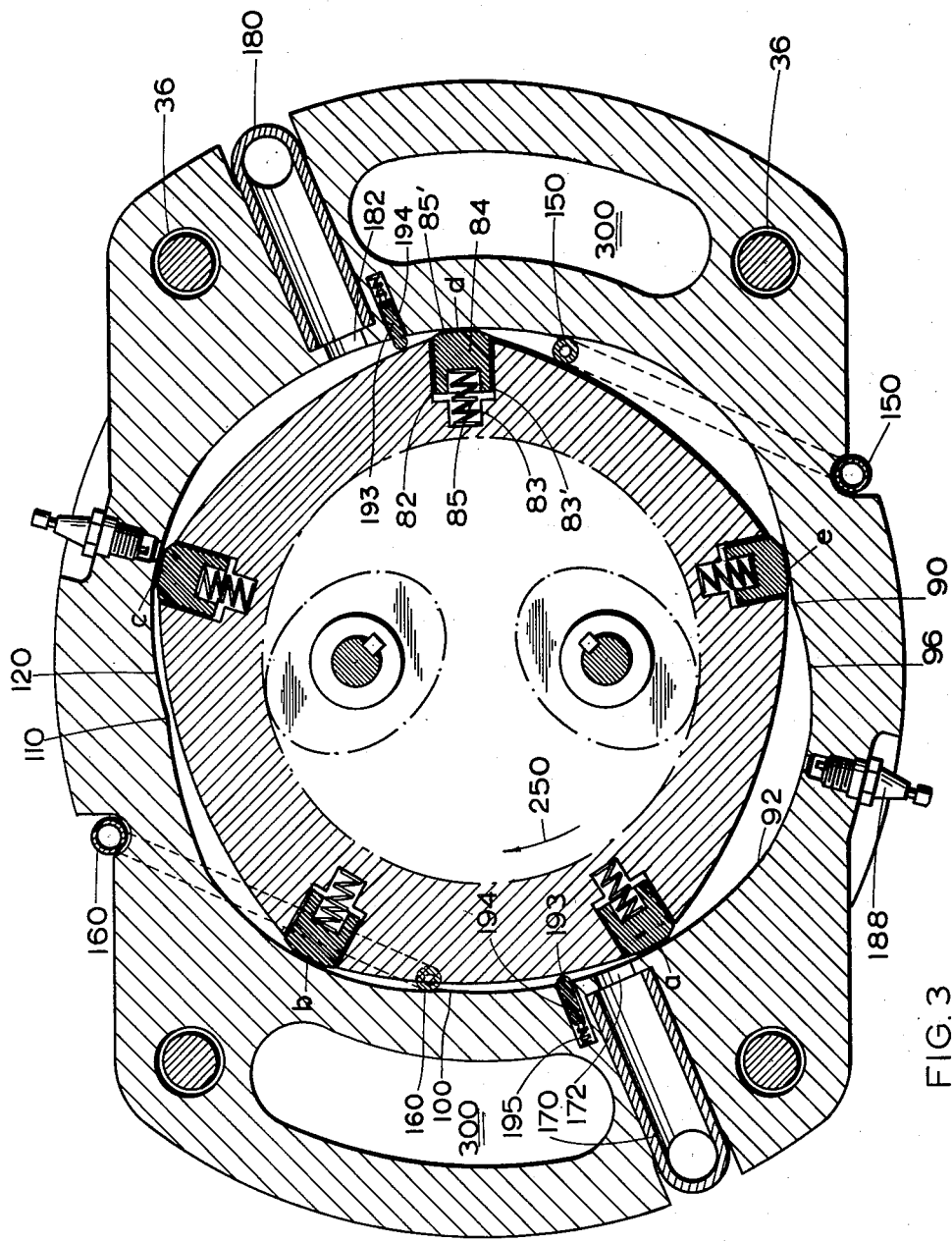
FIGURE 3 is a view similar to FIGURE 2 but with the rotor in a different position.

When the parts have reached the position shown in FIGURE 3, then the point "a" has almost come to the first exhaust pipe 170, and all points, "a, b, c, d and e" are touching the walls of the stator.

Figure 4:
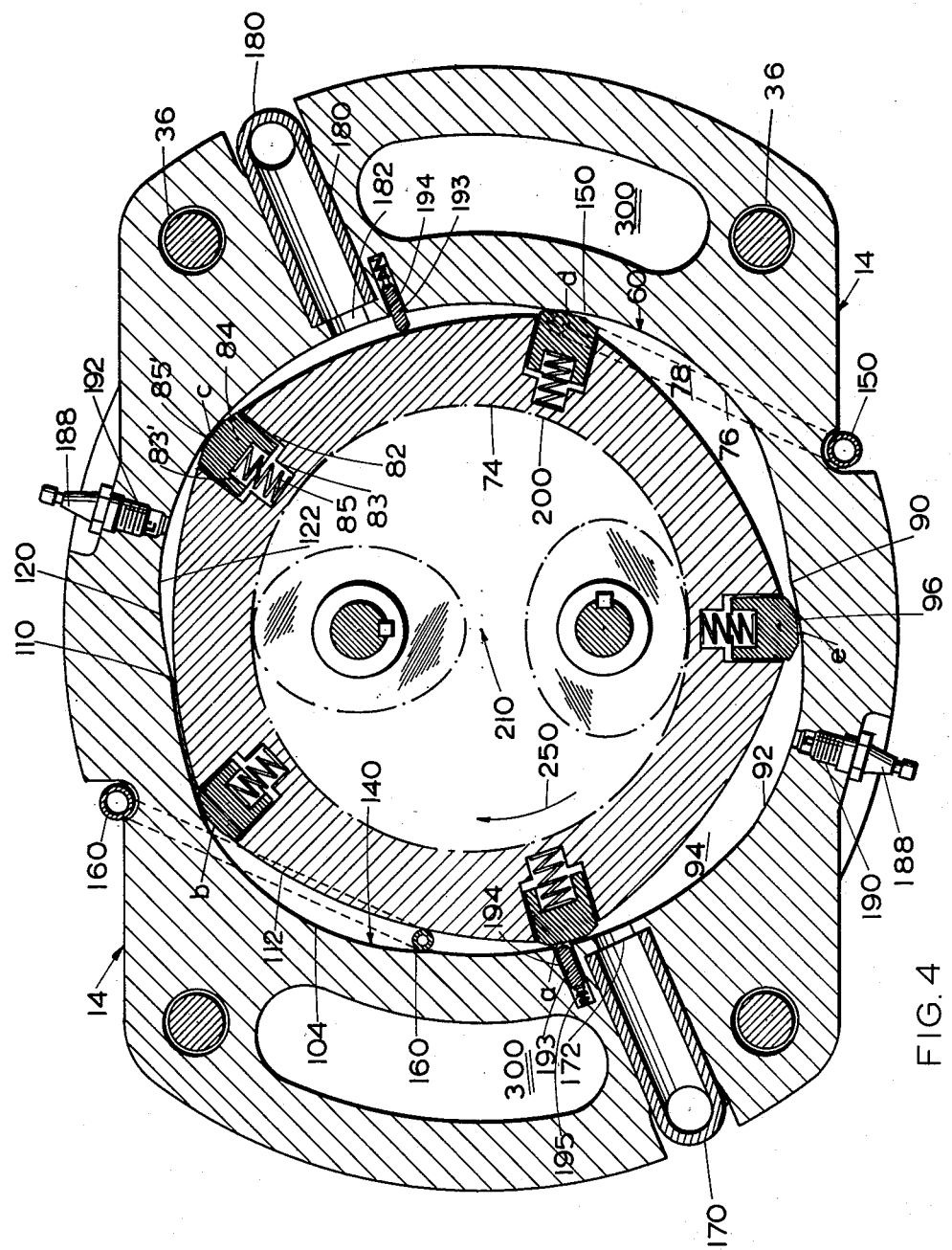
FIGURE 4 is a view similar to FIGURE 3 but with the rotor in further stage of rotation.

When the rotor has reached position shown in FIGURE 4, point "a" has passed the first exhaust pipe 170, whereby the combustion chamber 94, bounded by the rotor wall 74, is exhausting. At the same time it will be seen that the point "e" is in contact with the stator wall whereby the chambers 78 and 94 are not in communication. Also at that time intake fuel is not entering the intake pipe 150 because of fuel injection timing means comprising the fact that vacuum in any chamber in communication with the fuel intake pipe 150 will pull fuel into that chamber.

The stator housing can be cooled by any suitable coolant blowing through openings in the stator casting, such openings being seen at 300.

As thus described, it will be seen that this invention has fulfilled the objectives I have set forth.

From the foregoing description, it is thought to be obvious that the rotary combustion engine constructed in accordance with my invention is particularly well adapted for use, by reason of the convenience and facility with which it may be assembled and operated and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. An engine having a rotor, a stator defining a housing for said rotor, said rotor being substantially in the form of a five-sided polygon for defining five points, resilient sealing means in said rotor and each defining one of said five points, means mounting said rotor for rotation and planetation such that said rotor points are always in contact with the inner wall of said stator, said stator having an inner wall of generally circular shape but differing from a circle in that said inner wall has a first inwardly protruding portion, said first inwardly protruding stator portion dividing the stator wall into a first gas intake recess-forming wall portion which latter, with the rotor partly define a first combustion chamber, said stator inner wall having a second inwardly protruding stator portion, said first and second inwardly protruding portions being disposed approximately straight across said stator inner wall from each other, said second stator inwardly protruding portion dividing the stator wall into a second gas intake recess-forming wall portion and defining a beginning of a second gas combustion recess-forming wall portion which latter partly defines with the rotor a second gas combustion chamber, a first and a second fuel injection passage extending through said stator and disposed in communication with said first and second gas intake chambers at points spaced approximately 72 degrees rearwardly with respect to direction of rotor rotation from said first and second inwardly protruding stator portions respectively, first and second exhaust means extending through said stator and opening on said first and second combustion chambers respectively, said first and second exhaust means each opening on their respective combustion chamber at positions spaced apart later with respect to rotor rotation than the beginning of the respective combustion chamber at the respective inwardly protruding portion, two stator vanes for sealing the space between said stator and said rotor and each defining the remainder of a respective one of said combustion chambers, said stator having stator vane recesses therein, said recesses being disposed on the following side with respect to the direction of rotor rotation from the positions respectively that said first and second exhaust means open to the interior of said stator, said stator vanes each being slidably received each in one of said stator recesses, said stator vane recesses and stator vanes both being elongated in a direction generally radially of said rotor for the reciprocation of said stator vanes in said stator recesses and means in said stator vane recesses for urging said stator vanes towards said rotor and for permitting said stator vanes to move backward into said stator under pressure from said rotor, whereby said stator vanes force gases out the exhaust pipes when each rotor sealing means passes by the respective stator vane, and separate ignition means disposed one in each of said combustion chambers, said means mounting said rotor for rotation and planetation comprising two shafts with axes on opposite sides of a center point of said rotor, said shaft axes being disposed in a parallelism and being spaced apart, and elliptical gears disposed on said shaft respectively, said gears being arranged such that the longitudinal length of one is disposed at 90 degrees to the longitudinal length of the other, said gears being fixed to said shafts and carried thereby, said rotor having a circular inner wall having a circular row of teeth thereon engaging said elliptical gears for the carrying of said rotor by said gears.

2. The combination of claim 1 in which said ignition means are each disposed approximately 30 degrees beyond that inwardly protruding stator portion which defines the beginning of the respective gas combustion chamber, and said fuel exhaust passages extending through said stator inner wall at places disposed approximately 76 degrees beyond the closest adjacent stator inwardly projecting portion whereby one point on said rotor will not have moved beyond any portion of the respective exhaust means until a following point of said rotor is in contact with that inwardly projecting stator portion which is immediately rearward of said exhaust means.

3. An engine having a rotor, a stator defining a housing for said rotor, said rotor being substantially in the form of a five-sided polygon for defining five points, resilient sealing means in said rotor and each defining one of said five points, means mounting said rotor for rotation and planetation such that said rotor points are always in contact with the inner wall of said stator, said stator having an inner wall of generally circular shape but differing from a circle in that said inner wall has a first inwardly protruding portion, said first inwardly protruding stator portion dividing the stator wall into a first gas intake recess which latter with the rotor partly defines a first fuel injection recess-forming wall portion and a first combustion recess-forming wall portion, each of which latter with the rotor partly defines a first fuel injection chamber and a first combustion chamber respectively, said stator inner wall having a second inwardly protruding stator portion, said first and second inwardly protruding portions being disposed approximately straight across said stator inner wall from each other, said second stator inwardly protruding portion dividing the stator wall into a second gas intake recess-forming wall portion and a second gas combustion recess-forming wall portion each of which latter partly define with the rotor a second gas intake chamber and a second gas combustion chamber respectively, a first and a second fuel injection passage extending through said stator and disposed in communication with said first and second gas intake chambers at points spaced approximately 72 degrees rearwardly with respect to direction of rotor rotation from said first and second inwardly protruding stator portions respectively, first and second exhaust means extending through said stator and opening on said first and second combustion chambers respectively, said first and second exhaust means each opening on their respective combustion chamber at positions approximately 72 degrees later with respect to rotor rotation than the beginning of the respective combustion chamber at the respective inwardly protruding portions, two stator vanes for sealing the space between said stator and said rotor and each defining the remainder of the wall area of a respective one of said combustion recesses, said stator having stator vane recesses therein, said recesses being disposed on the forward side with respect to the direction of rotor rotation from the positions respectively that said first and second exhaust means open to the interior of said stator, said stator vanes each being slidably received each in one of said stator recesses, said stator vane recesses and stator vanes being elongated in a direction generally radially of said rotor for the reciprocation of said stator vanes in said stator recesses and means in said stator vane recesses for urging said stator vanes towards said rotor and for permitting said stator vanes to move backward into said stator under pressure from said rotor, whereby said stator vanes force gases out the exhaust pipes when each rotor sealing means passes by the respective stator vane, and separate ignition means disposed one in each of said combustion chambers.

References Cited in the file of this patent

UNITED STATES PATENTS

| | | |
|---|---|---|
| 2,740,386 | Crandall | Apr. 3, 1956 |

FOREIGN PATENTS

| | | |
|---|---|---|
| 61,871 | Sweden | Aug. 31, 1923 |
| 581,717 | France | Oct. 1, 1924 |
| 628,096 | France | June 21, 1927 |
| 1,059,495 | France | Nov. 10, 1953 |
| 540,994 | Italy | Mar. 16, 1956 |
| 1,125,876 | France | July 16, 1956 |